(12) United States Patent
Iyo

(10) Patent No.: US 12,478,044 B2
(45) Date of Patent: Nov. 25, 2025

(54) ANIMAL VITALITY PROCESSING SYSTEM AND METHOD

(71) Applicant: RABO, Inc., Tokyo (JP)

(72) Inventor: Yukiko Iyo, Tokyo (JP)

(73) Assignee: RABO, Inc., Tokyo (JP)

( * ) Notice: Subject to any disclaimer, the term of this patent is extended or adjusted under 35 U.S.C. 154(b) by 176 days.

(21) Appl. No.: 18/458,156

(22) Filed: Aug. 30, 2023

(65) Prior Publication Data

US 2024/0081294 A1  Mar. 14, 2024

(30) Foreign Application Priority Data

Sep. 12, 2022 (JP) ................... 2022-144820

(51) Int. Cl.
*A01K 29/00* (2006.01)
*A01K 27/00* (2006.01)

(52) U.S. Cl.
CPC .......... *A01K 29/005* (2013.01); *A01K 27/009* (2013.01)

(58) Field of Classification Search
CPC ............................ A01K 29/005; A01K 27/009
See application file for complete search history.

(56) References Cited

U.S. PATENT DOCUMENTS

| | | | |
|---|---|---|---|
| 7,762,953 B2 * | 7/2010 | Derchak | A01K 29/005 600/300 |
| 8,677,941 B2 * | 3/2014 | Yanai | A61F 7/00 119/174 |
| 9,668,459 B2 * | 6/2017 | Bonge, Jr. | G01S 5/011 |
| 9,936,271 B2 * | 4/2018 | Dror | A61B 5/1118 |
| 10,149,617 B2 * | 12/2018 | Couse | A61B 5/7275 |
| 10,922,995 B2 * | 2/2021 | Donavon | G09B 19/0092 |
| 12,080,416 B2 * | 9/2024 | Donavon | G16H 40/63 |
| 2010/0302004 A1 * | 12/2010 | Winstead | A01K 29/005 119/859 |
| 2013/0186962 A1 * | 7/2013 | Kennett | G06K 1/128 235/494 |
| 2023/0000057 A1 * | 1/2023 | Kim | G06Q 30/0251 |

FOREIGN PATENT DOCUMENTS

JP  2018-099178 A  6/2018

* cited by examiner

*Primary Examiner* — John A Tweel, Jr.
(74) *Attorney, Agent, or Firm* — HAUPTMAN HAM, LLP

(57) ABSTRACT

An information processing system includes: an activity acquiring unit that acquires an activity amount from a sensor mounted on an animal; a storage unit that stores the previously acquired activity amount corresponding to datetime; a behavior identifying unit that identifies a behavior of the animal by frequency analysis of the activity amount; a vitality disappearance determining unit that determines whether the vitality of the animal has disappeared according to whether the activity amount on a particular day is less than a first threshold defined by the activity amount in a period prior to the particular day and whether a number of times or time length of the predetermined behavior on the particular day is less than a second threshold defined by the number of times or the time length during the period; and a notifying unit that notifies that the vitality has disappeared.

8 Claims, 8 Drawing Sheets

ANIMAL VITALITY PROCESSING SYSTEM AND METHOD

RELATED APPLICATIONS

The present application claims priority to Japanese Application Number 2022-144820, filed Sep. 12, 2022, the disclosure of which is hereby incorporated by reference herein in its entirety.

TECHNICAL FIELD

The present invention relates to information processing systems, information processing methods, and programs.

BACKGROUND ART

PTL 1 discloses that a pet condition is determined using an acceleration sensor or a barometric pressure sensor.

CITATION LIST

Patent Literature

[PTL 1] Japanese Patent Application Publication No. 2018-99178

SUMMARY OF INVENTION

Technical Problem

However, it is difficult to ascertain whether a pet has vitality in PTL 1.

The present invention was made in light of this background and is intended to provide a technology capable of figuring out the vitality of an animal.

Solution to Problem

The principal invention for solving the above-described problem is an information processing system comprising: an activity acquiring unit that acquires an activity amount from a sensor mounted on an animal; a storage unit that stores the previously acquired activity amount corresponding to date-time; a behavior identifying unit that identifies a behavior of the animal by frequency analysis of the activity amount; a vitality disappearance determining unit that determines whether the vitality of the animal has disappeared according to whether the activity amount on a particular day is less than a first threshold defined by the activity amount in a period prior to the particular day and whether a number of times or time length of the predetermined behavior on the particular day is less than a second threshold defined by the number of times or the time length during the period; and a notifying unit that notifies that the vitality has disappeared.

The other problems disclosed in the present application and the method for solving them are clarified in the sections and drawings of the embodiments of the invention.

Advantageous Effects of Invention

According to the present invention, it is possible to figure out the vitality of an animal.

DESCRIPTION OF EMBODIMENTS

System Overview

Hereinafter, a management system according to one embodiment of the present invention will be described. The management system of this embodiment is intended to control the condition of an animal, such as a cat. In this embodiment, we are trying to detect, among other things, the disappearance of the vitality of the cat as soon as possible.

Figure 1:
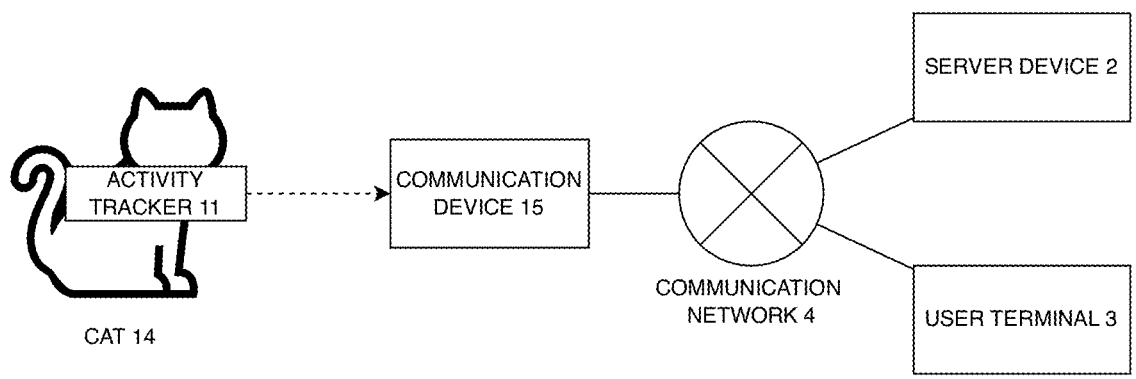
FIG. 1 is a diagram illustrating an example of an overall configuration of a management system according to an embodiment of the present invention.

FIG. 1 is a diagram illustrating an example of an overall configuration of a management system according to an embodiment of the present invention. The management system of this embodiment includes a server device 2. The server device 2 is a computer that manages the condition of the cat 14. The server device 2 may be a general-purpose computer, such as a workstation or a personal computer, or may be logically implemented by cloud computing.

In the management system of this embodiment, the cat 14 is equipped with an activity tracker 11. The activity tracker 11 measures the activity of the cat 14 and may comprise, for example, a 3-axis acceleration sensor. Based on the acceleration by the acceleration sensor, the posture and the movement of the cat 14 can be detected by known methods. The activity tracker 11 can be comfortably mounted on the cat 14 by making it in the form of a so-called collar.

The communication device 15 is communicatively connected to the server device 2 via a communication network 4. The communication network 4 is, for example, the Internet and may be constructed by a public telephone network, a cellular telephone network, a wireless communication line, an Ethernet (registered trademark), or the like. The communication device 15 may forward the measurements of the activity tracker 11 to the server device 2 as a gateway device. It should be noted that the communication device 15 may transmit the measured value (weight) with information (pendant ID) identifying the activity tracker 11.

The server device 2 is also communicatively connected to the user terminal 3 via communication network 4. The user terminal 3 is a computer operated by the owner of the animal 14, such as a smartphone, a tablet computer, a personal computer, and the like.

<Server Device>

Figure 2:
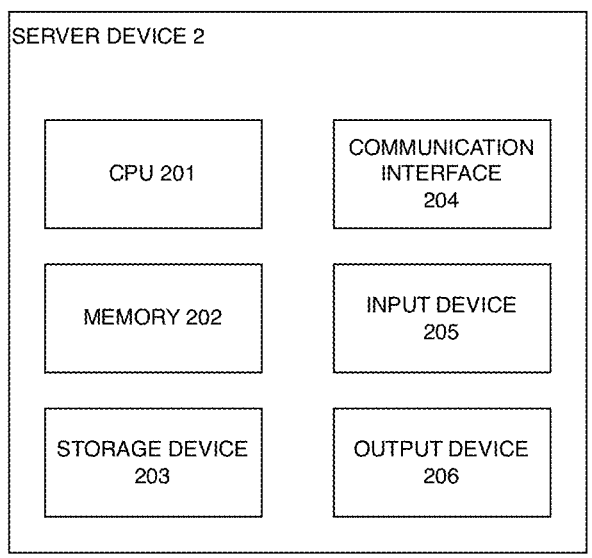
FIG. 2 is a diagram illustrating an example of a hardware configuration of the server device 2.

FIG. 2 is a diagram illustrating an example of a hardware configuration of the server device 2. The illustrated configuration is exemplary and may have other configurations. The server device 2 includes a CPU 201, a memory 202, a storage device 203, a communication interface 204, an input device 205, and an output device 206. The storage device 203 may be, for example, a hard disk drive, a solid-state drive, a flash memory, or the like, for storing various types of data or programs. The communication interface 204 is an interface for connecting to the communication network 3, such as an adapter for connecting to an Ethernet (registered trademark), a modem for connecting to a public telephone network, a wireless communication device for performing wireless communication, a USB (Universal Serial Bus) connector for serial communication, or an RS232C connector. The input device 205 may be, for example, a keyboard or mouse, a touch panel, a button, a microphone, or the like, for inputting data. The output device 206 may be, for example, a display, a printer, a speaker, or the like, for outputting data. The functional units of the server device 2, which will be described later, are realized by reading a program stored in the storage device 203 into the memory 202 and executing it, and each storage units of the server device 2 is realized as a part of the storage area provided by the memory 202 and the storage device 203.

Figure 3:
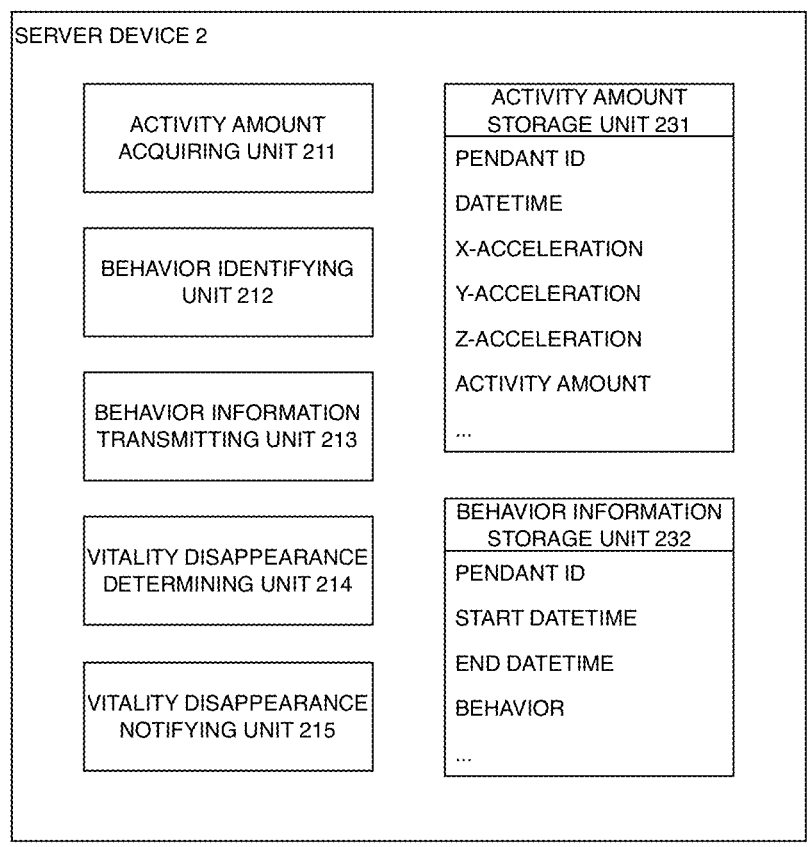
FIG. 3 is a diagram illustrating an example of a software configuration of the server device 2.

FIG. 3 is a diagram illustrating an example of a software configuration of the server device 2. The server device 2 includes an activity amount acquiring unit 211, a behavior identifying unit 212, a behavior information transmitting unit 213, a vitality disappearance determining unit 214, a vitality disappearance notifying unit 215, an activity amount storage unit 231, and a behavior information storage unit 232.

<Storage Unit>

The activity amount storage unit 231 stores information on the activity amount of the cat 14 (hereinafter referred to as the activity amount information). The activity amount information may include acceleration (x, y, and z accelerations) for each axis of the 3-axis acceleration sensor and the activity amount in which those are summed up corresponding to the pendant ID which identifies the activity tracker 11 and datetime.

The behavior information storage unit 232 stores information on the behavior of the cat 14 (hereinafter referred to as the behavior information). The Behavior information may include the start datetime, the end datetime, and the behavior presumed to have been performed by the cat 14, corresponding to the pendant ID which identifies the activity tracker 11.

<Functional Unit>

The activity amount acquiring unit 211 acquires the activity amount from the activity tracker 11 mounted on the cat 14. In this embodiment, the activity amount acquiring unit 211 acquires the 3-axis acceleration transmitted from the activity tracker 11 mounted on the cat 14 through the communication device 15.

The behavior identifying unit 212 identifies the behavior of the cat 14 based on the activity amount. The behavior identifying unit 212 can identify the behavior of the cat 14, for example, by frequency analysis of activity amounts. Methods for determining the behavior type can be implemented by several known behavioral analysis methods. For example, the xyz-axis acceleration data (Gx, Gy, Gz) obtained from the activity tracker 11 may be decomposed into cycles and amplitudes by time using wavelet transformations to recognize the periodicity of the signal at each time as the behavioral spectrum and to classify the behavior by comparing it with the pre-registered behavior elements according to spectral similarities. For example, the behavior can be identified by Fourier transforming the acceleration data obtained from the acceleration sensor 5 and comparing the average or peak values of the frequency components calculated along the time axis with known frequencies corresponding to the same or another cat behavioral type (moving, sleeping, eating, toilet, etc.) or by extracting characteristic waveforms or spectral values based on the frequency components calculated by using the acceleration components (FFT) and comparing them with known characteristic waveforms or spectral values corresponding to the same or another cat behavioral type (moving, sleeping, eating, toilet, etc.). It is also possible to infer the behavior type by figuring out the posture of the cat from the postures ($\theta x$, $\theta y$, $\theta z$) in each axial direction calculated by the acceleration sensor. It is also possible to perform a pattern matching with the pattern by providing a pattern storage unit for storing the pattern of the spectrum.

In this embodiment, the identifiable behavior by the behavior identifying unit 212 is considered to include at least eating, water drinking, and hair grooming. Since the frequency characteristics at the time of eating, at the time of water drinking and at the time of hair grooming are different, it is possible to distinguish behavior only from acceleration data measured by the activity tracker 11.

The behavior identifying unit 212 identifies the start and end datetimes of the identified behavior, creates behavior information including the specified start and end datetimes, the specified behavior, and the pendant ID indicating the activity tracker 11, and registers it into the behavior information storage unit 232.

The behavior information transmitting unit 213 transmits the behavior information to the user terminal 3. For example, the behavior information transmitting unit 213 may transmit the behavior information in response to a request from the user terminal 3. It is assumed that a pendant ID representing the activity tracker 11 mounted on the cat 14 in the request, and the behavior information transmitting unit 213 can read the behavior information corresponding to the pendant ID set in the request from the behavior information storage unit 232 and transmit the behavior information to the user terminal 3.

The vitality disappearance determining unit 214 determines whether or not the vitality of the cat 14 is disappeared. In this embodiment, the vitality disappearance determining unit 214 can determine the disappearance of the vitality for a plurality of lengths of periods. In this embodiment, a short-term (1 day), medium-term (6 weeks), and long-term (3 months) vitality disappearance is determined.

Figure 4:
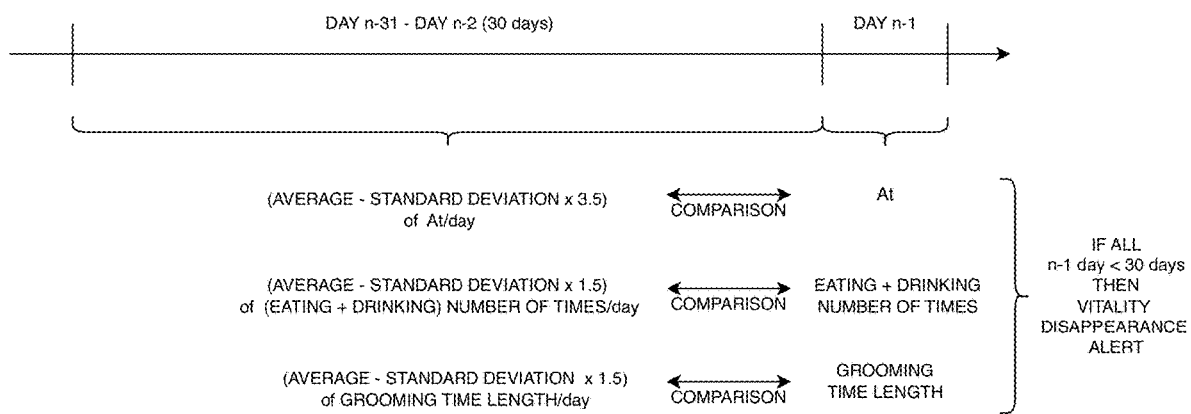
FIG. 4 is a diagram illustrating a process for determining the disappearance of vitality of the cat 14 during the short period of time.

FIG. 4 is a diagram illustrating a process for determining the disappearance of vitality of the cat 14 during the short period of time. The vitality disappearance determining unit 214 may determine whether or not the vitality of the animal is disappeared according to, for example, whether the activity amount (the sum of the accelerations At) at the particular day of the determination (a day before) is lower than the first threshold determined based on the activity amount At in the period prior to the particular day, and whether the number of times or the time length of the predetermined behavior (in the example of FIG. 4, eating, drinking, and grooming) on the particular day is lower than the second threshold determined based on the number of times or the time length of the predetermined behavior in the preceding period.

The vitality disappearance determining unit 214 may calculate the value obtained by subtracting, from the average value of the activity amounts in the 30 days before the target date (n−31 to n−2 days), the offset value (3.5 times the standard deviation in the example of FIG. 4) based on the standard deviation of the activity amount in these 30 days as the first threshold.

In addition, the vitality disappearance determining unit 214 may calculate the value obtained by subtracting, from the average value of the number of times of eating and drinking (the number of behavior information including eating and water drinking behavior) during the preceding 30 days, the offset value (1.5 times the standard deviation) based on the standard deviation of the number of times of eating and drinking as the second threshold for the number of times of eating and drinking.

In addition, the vitality disappearance determining unit 214 may calculate the value obtained by subtracting, from the average value of the grooming time (the time from the start date and time to the end date of the behavioral information including the grooming behavior) in the preceding 30 days, the offset value (1.5 times the standard deviation) based on the standard deviation of the time length as the second threshold for the grooming time.

The vitality disappearance determining unit 214 may determine that the vitality is disappeared within a short-term (1 day) if the value on the previous day is below the first and second thresholds obtained from the average and the standard deviation of the previous 30 days regarding all the activity amount At, the number times of eating and drinking, and the time length of grooming.

The vitality disappearance determining unit may calculate a trend of change in the activity amount during a second period (in this embodiment, 6 weeks or 90 days) that is longer than the first period (in this embodiment, 1 day) before the target date, and determine that the vitality of the cat 14 is disappeared when the trend of change is descending in a predetermined degree or more.

It is noted that the vitality disappearance determining unit 214 may, if the At per day is 5 or less, define the day as the "abnormal data day." Further, the vitality disappearance determining unit 214 may sort the datetime of the activity amount information per day and assume that the measurement is not continuing if the difference between the datetimes of the two neighboring activity amount information is equal to or more than a predetermined threshold (for example, an arbitrary value of 10 minutes, 30 minutes, 1 hour, and so forth), and when the time during which the measurement continues within a day is 16 hours or less, the day is defined as the "data shortage day." The vitality disappearance determining unit 214 may prevent the determination of the disappearance of the vitality when the number of days of abnormal data day and data shortage day is 15 days or more during the preceding 30 days. Further when the target date (n−1) is the abnormal data day or the data shortage day, it is possible to prevent the determination of the disappearance of the vitality.

In addition, the vitality disappearance determining unit 214 may compute by using only data below the 80% percentile when calculating the standard deviation of the activity amount. Further, regarding the average and the standard deviation, it is possible to prevent using abnormal data day and data shortage day.

Figure 5:
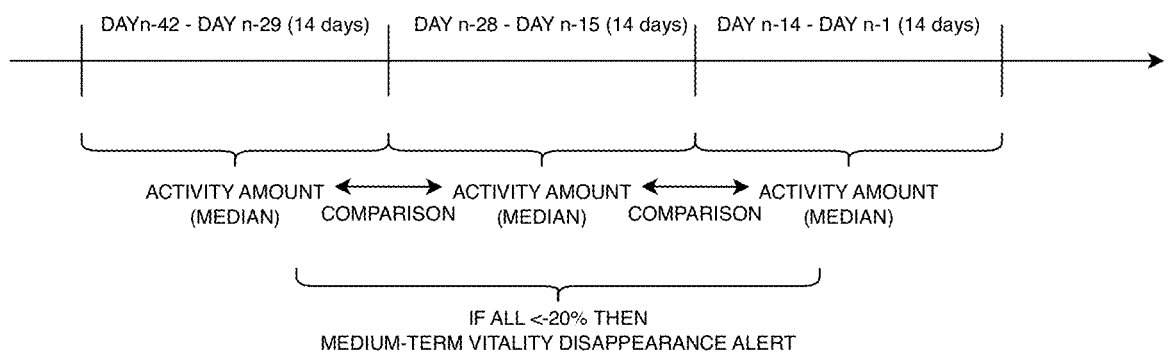
FIG. 5 is a diagram illustrating a process for determining the disappearance of vitality of the cat 14 during the middle period of time.

FIG. 5 is a diagram illustrating a process for determining the disappearance of vitality of the cat 14 during the middle period of time. The vitality disappearance determining unit 214 may, for example, calculate the median of the activity amounts At every 2 weeks from 6 weeks before the current date. In other words, the vitality disappearance determining unit 214 may calculate the median At (t−3) of the activity amounts during the 2 periods before the previous period (n−42 days to n−29 days), the median AT (t−2) of the activity amounts during a prior before the previous period (n−28 days to n−15 days), and the median At(t−1) of the activity amounts during the previous period (n−14 days to n−15 days), and may determine that the vitality of the cat 14 has disappeared in 6 weeks when the activity amount of At has decreased more than 20% from the 2 periods before the previous period to a period before the previous period (At(t−2)<At(t−3)*0.8) and the activity amount At has further decreased more than 20% from a period before the previous period to the previous period (At(t−1)<At(t−2)× 0.8).

Note that in the determination process of the vitality disappearance regarding the medium term, the vitality disappearance determining unit 214 defines the "abnormal data day" and the "data shortage day," and when the number of abnormal data days and data shortage days is 7 days or more within 2 weeks (14 days), the determination of the disappearance of the vitality may not be performed.

In addition, even when the age of the cat 14 is less than 14 months, the vitality disappearance determining unit 214 may not determine the vitality disappearance.

Figure 6:
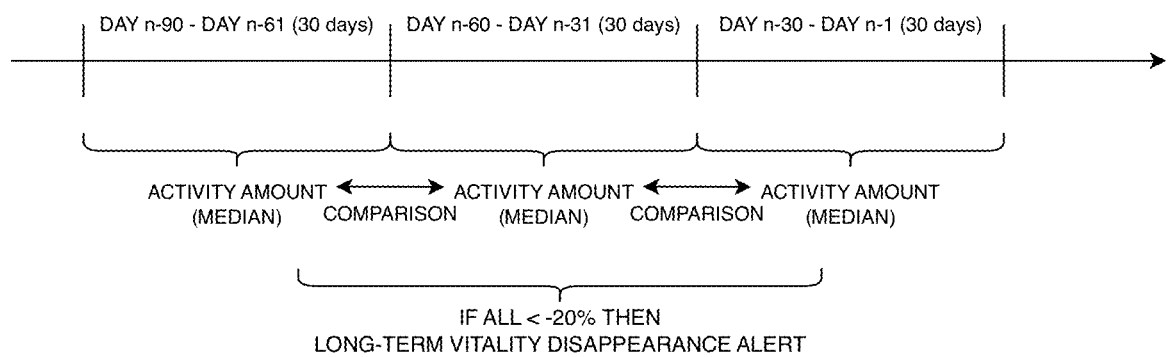
FIG. 6 is a diagram illustrating a process for determining the disappearance of vitality of the cat 14 during the long period of time.

FIG. 6 is a diagram illustrating a process for determining the disappearance of vitality of the cat 14 during the long period of time. The vitality disappearance determining unit 214 may, for example, calculate the median of the activity amount At every 30 days from 90 days before the present date. In other words, the vitality disappearance determining unit 214 may calculate the median At(t−3) of the activity amounts during 2 periods before the previous period (n−90 days to n−61 days), the median At(t−2) of the activity amounts during a period before the previous period (n−60 days to n−31 days) and the median At(t−1) of the activity amounts during the previous period (n−30 days to n−31 days), and may determine that the vitality of the cat 14 disappeared in 90 days (3 months) when the activity amount At has decreased more than 20% from the 2 periods before the previous period to a period before the previous period (At(t−2)<At(t−3)×0.8) and the activity amount At has decreased more than 20% from a period before the previous period to the previous period (At(t−1)<At(t−2)×0.8).

In the determination process of the vitality disappearance for the long-term, the "abnormal data day" and the "data shortage day" are defined by the vitality disappearance determining unit 214, and when the number of the abnormal data days and the data shortage days is 15 days or more out of 30 days, the determination of the disappearance of vitality may not be performed.

In addition, even when the age of the cat 14 is less than 14 months, the vitality disappearance determining unit 214 may not determine the vitality disappearance.

The vitality disappearance notifying unit 215 notifies the user terminal 3 that the vitality is disappearing. When it is determined that the vitality has disappeared in a short-term, the vitality disappearance notifying unit 215 may send a notice of it (short-term vitality disappearance alert). When it is determined that the vitality has disappeared in a medium-term, the vitality disappearance notifying unit 215 may send a notice of it (medium-term vitality disappearance alert). When it is determined that the vitality has disappeared in a long-term, the vitality disappearance notifying unit 215 may send a notice of it (long-term vitality disappearance alert).

<Action>

Hereinafter, the action of the management system according to the present embodiment will be described.

Figure 7:
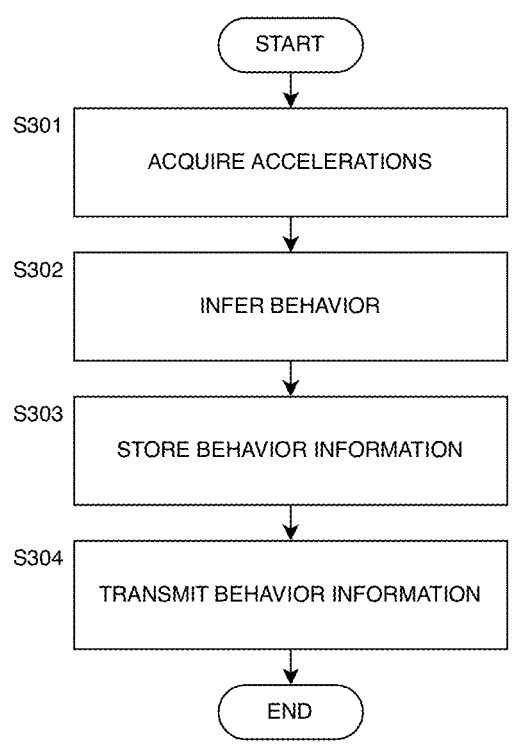
FIG. 7 is a diagram illustrating a registration process of the behavior information.

FIG. 7 is a diagram illustrating a registration process of the behavior information. The server device 2 acquires the acceleration data from the activity tracker 11 and creates the activity amount information including the pendant ID indicating the activity tracker 11, the current datetime, the acceleration data (x-acceleration, y-acceleration, z-acceleration) and the total At (activity amount) thereof, and registers the activity amount information in the activity amount storage unit 231 (S301). The server device 2 infers the behavior of the cat 14 by analyzing the acceleration data (S302). The server device 2 creates a behavior information including the pendant ID indicating the activity tracker 11, the earliest datetime (start datetime) and the last datetime (end datetime) of the activity amount information pertaining to the behavior, and the inferred behavior, and registers it in the behavior information storage unit 232 (S303). The server device 2 may transmit behavior information to the user terminal 3 (S304). The server device 2 may transmit behavior information in response to a request from the user terminal 3 or may transmit behavior information periodically or whenever behavior information is registered (S305).

Figure 8:
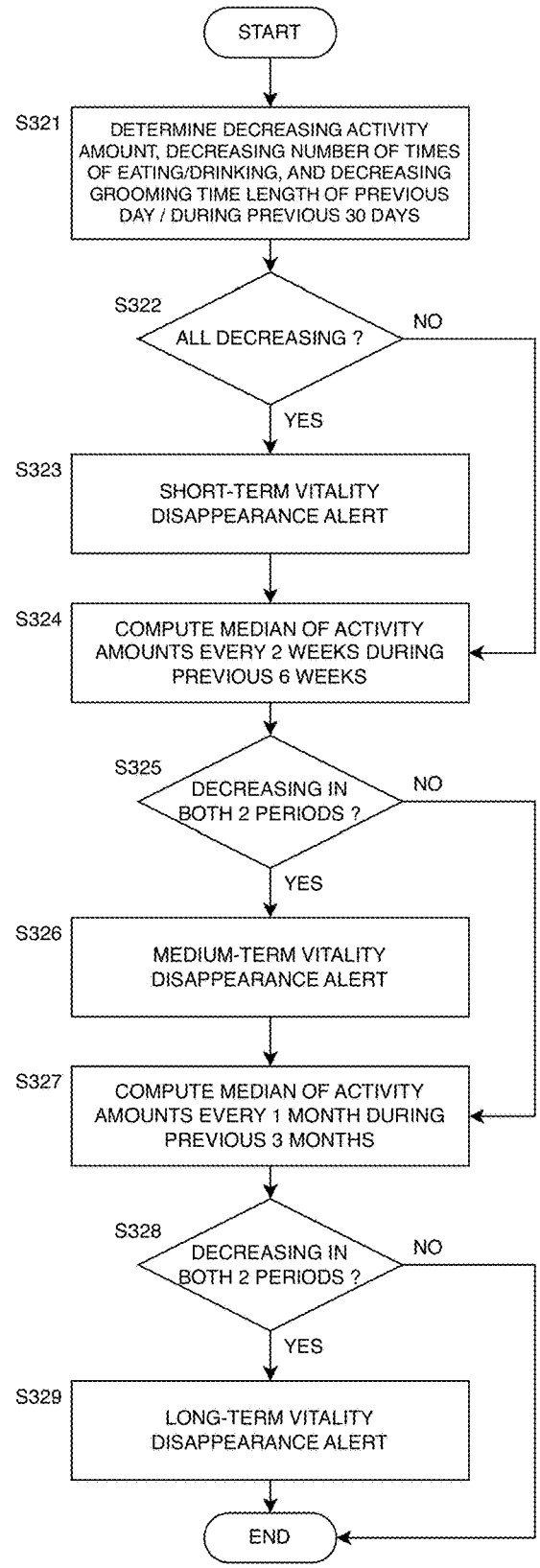
FIG. 8 is a diagram illustrating a notification process of vitality disappearance.

FIG. 8 is a diagram illustrating a notification process of vitality disappearance.

As shown in FIG. 4, the server device 2 computes the activity amount on the previous day and during 30 days before, the number of times of eating and drinking, and the time length of grooming as shown in FIG. 4 (S321), and transmits the short-term vitality disappearance alert to the user terminal 3 (S323) when all the activity amount, the number of times of eating and drinking, and the time length of grooming are below the first and second thresholds (S322: YES). The server device 2 computes the median of the activity amount for every two weeks during the previous six weeks as shown in FIG. 5 (S324), and when both the previous period and a period before the previous period decreased by 20% or more than its previous period (S325: YES), transmits the medium-term vitality disappearance alert to the user terminal 3 (S326). The server device 2 computes the median of the activity amount for every 30 days during the previous 90 days as shown in FIG. 6 (S327), and when both the previous period and a period before the previous period decreased by 20% or more from its previous period (S328: YES), transmits the medium-term vitality disappearance alert to the user terminal 3 (S329).

As described above, it is possible to detect the disappearance of the vitality of the cat 14 based on the activity amount measured by the activity tracker 11, and to notify the user terminal 3.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

<Disclosures>

The present disclosure also includes the following configurations.

[Item 1]
An information processing system comprising:
acquiring an activity acquiring unit that acquires an activity amount from a sensor mounted on an animal;
a storage unit that stores the previously acquired activity amount corresponding to datetime;
a behavior identifying unit that identifies a behavior of the animal by frequency analysis of the activity amount;
a vitality disappearance determining unit that determines whether the vitality of the animal has disappeared according to whether the activity amount on a particular day is less than a first threshold defined by the activity amount in a period prior to the particular day and whether a number of times or time length of the predetermined behavior on the particular day is less than a second threshold defined by the number of times or the time length during the period; and
a notifying unit that notifies that the vitality has disappeared.

[Item 2]
The information processing system according to item 1, wherein:
the vitality disappearance determining unit further calculates a trend of change of the activity amount during a second period longer than a first period before the particular day, and when the trend of change is descending in a predetermined degree or more, determines that the vitality of the animal is disappearing.

[Item 3]
The information processing system according to item 1, wherein:
the behavior includes grooming.

[Item 4]
The information processing system according to item 3, wherein:
the behavior further includes at least one of eating and drinking.

[Item 5]
The information processing system according to item 1, wherein:
the vitality disappearance determining unit calculates a value obtained by subtracting an offset value based on a standard deviation of the activity amount in the period from an average value of the activity amount in the period as the first threshold.

[Item 6]
The information processing system according to item 1, wherein:
the vitality disappearance determining unit calculates a value obtained by subtracting an offset value based on the number of times or the time length of the behavior in the period from an average value of the number of times or the time length of the behavior in the period as the second threshold.

[Item 7]
An information processing method executed by an information processing device, the method comprising:
acquiring an activity amount from a sensor mounted on an animal;
storing the previously acquired activity amount corresponding to datetime;
identifying a behavior of the animal by frequency analysis of the activity amount;
determining whether the vitality of the animal has disappeared according to whether the activity amount on a particular day is less than a first threshold defined by the activity amount in a period prior to the particular day and whether a number of times or time length of the predetermined behavior on the particular day is less than a second threshold defined by the number of times or the time length during the period; and
notifying that the vitality has disappeared.

[Item 8]
A program to cause an information processing device to execute:
acquiring an activity amount from a sensor mounted on an animal;
storing the previously acquired activity amount corresponding to datetime;
identifying a behavior of the animal by frequency analysis of the activity amount;
determining whether the vitality of the animal has disappeared according to whether the activity amount on a particular day is less than a first threshold defined by the activity amount in a period prior to the particular day and whether a number of times or time length of the predetermined behavior on the particular day is less than a second threshold defined by the number of times or the time length during the period; and notifying that the vitality has disappeared.

REFERENCE SIGNS LIST

2 Server Device
3 User Terminal
4 Activity Tracker
14 Cat
15 Communication Device

The invention claimed is:

1. An information processing system comprising:
a central processing unit (CPU) configured to:
acquire activity data including x-axis, y-axis and z-axis accelerations from a sensor mounted on an animal;
identify a behavior of the animal by performing frequency analysis on the activity data and compare the results with pre-registered behavior patterns; and
determine disappearance of vitality of the animal based on:
whether an activity amount on a specific day is less than a first threshold computed from historical activity data over a past period, and
whether a number of times or a duration of the specific behavior including at least one of eating, drinking, and grooming is less than a second threshold computed from historical behavior data over the same period;
a storage configured to store the acquired activity data associated with a datetime and a pendant ID for identifying the sensor; and
a notifier configured to transmit an alert signal to a user terminal in response to a determination of the disappearance of vitality.

2. The information processing system according to claim 1, wherein:
the central processing unit is further configured to calculate a trend of change of the activity amount during a second period longer than a first period before the particular day, and when the trend of change is descending in a predetermined degree or more, determines that the vitality of the animal is disappearing.

3. The information processing system according to claim 1, wherein:
the behavior includes grooming.

4. The information processing system according to claim 3, wherein:
the behavior further includes at least one of eating and drinking.

5. The information processing system according to claim 1, wherein:
the central processing unit is further configured to calculate a value obtained by subtracting an offset value based on a standard deviation of the activity amount in the period from an average value of the activity amount in the period as the first threshold.

6. The information processing system according to claim 1,
wherein:
the central processing unit is further configured to calculate a value obtained by subtracting an offset value based on the number of times or the time length of the behavior in the period from an average value of the number of times or the time length of the behavior in the period as the second threshold.

7. An information processing method executed by an information processing device, the method comprising:
acquiring an activity data including x-axis, y-axis and z-axis accelerations from a sensor mounted on an animal;
storing the acquired activity data associated with a datetime and a pendant ID for identifying the sensor;
identifying a behavior of the animal by performing frequency analysis on the activity data and comparing the results with pre-registered behavior patterns;
determining disappearance of vitality of the animal based on:
an activity amount on a specific day is less than a first threshold computed from historical activity data over a past period, and
whether a number of times or a duration of the specific behavior including at least one of eating, drinking, and grooming is less than a second threshold computed from historical behavior data over the same period; and
notifying by transmitting an alert signal to a user terminal in response to a determination of the disappearance of vitality.

8. A non-transitory computer readable medium storing thereon a program to cause an information processing device to execute:
acquiring activity data including x-axis, y-axis and z-axis accelerations from a sensor mounted on an animal;
storing the acquired activity data associated with a datetime and a pendant ID for identifying the sensor;
identifying a behavior of the animal by performing frequency analysis on the activity data and comparing the results with pre-registered behavior patterns; and
determining disappearance of vitality of the animal based on:
whether an activity amount on a specific day is less than a first threshold computed from historical activity data over a past period, and
whether a number of times or a duration of the specific behavior including at least one of eating, drinking, and grooming is less than a second threshold computed from historical behavior data over the same period.

* * * * *